US007088997B1

(12) United States Patent
Boehmke

(10) Patent No.: US 7,088,997 B1
(45) Date of Patent: Aug. 8, 2006

(54) SYSTEM, METHOD AND APPARATUS FOR MAINTAINING CELLULAR TELEPHONE NETWORK SITE INFORMATION

(75) Inventor: Yuergen Boehmke, Parkland, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 478 days.

(21) Appl. No.: 09/955,401

(22) Filed: Sep. 12, 2001

Related U.S. Application Data

(63) Continuation-in-part of application No. 09/746,502, filed on Dec. 22, 2000.

(51) Int. Cl.
*H04Q 7/20* (2006.01)
(52) U.S. Cl. ............... 455/423; 455/424; 455/425
(58) Field of Classification Search ........... 455/423, 455/424, 425, 561, 67.11, 67.13, 446, 508; 707/101, 1
See application file for complete search history.

(56) References Cited

U.S. PATENT DOCUMENTS

| | | | |
|---|---|---|---|
| 4,819,162 A | 4/1989 | Webb, Jr. et al. | |
| 5,095,500 A | 3/1992 | Tayloe et al. | ............. 379/32.01 |
| 5,216,612 A | 6/1993 | Cornett et al. | ............... 700/96 |
| 5,285,494 A * | 2/1994 | Sprecher et al. | ............ 455/423 |
| 5,297,193 A | 3/1994 | Bouix et al. | ................ 455/423 |
| 5,412,758 A | 5/1995 | Srikanth et al. | .............. 706/59 |
| 5,425,076 A | 6/1995 | Knippelmier | |
| 5,426,688 A | 6/1995 | Anand | |
| 5,491,644 A | 2/1996 | Pickering et al. | ........... 709/226 |
| 5,530,861 A | 6/1996 | Diamant et al. | ............... 705/8 |
| 5,640,684 A | 6/1997 | Konosu et al. | ............ 455/67.7 |
| 5,710,917 A | 1/1998 | Musa et al. | ................. 395/610 |
| 5,799,154 A | 8/1998 | Kuriyan | ..................... 709/223 |
| 5,826,252 A | 10/1998 | Wolters et al. | ................ 707/1 |
| 5,867,558 A | 2/1999 | Swanson | |
| 5,905,988 A | 5/1999 | Schwartz et al. | ........... 707/104 |
| 5,940,471 A | 8/1999 | Homayoun | |
| 6,008,808 A | 12/1999 | Almeida et al. | ............ 715/767 |
| 6,012,067 A | 1/2000 | Sarkar | |
| 6,016,340 A | 1/2000 | Bayraktar | |
| 6,018,567 A | 1/2000 | Dulman | |

(Continued)

OTHER PUBLICATIONS

U.S. Appl. No. 09/746,502, filed Dec. 22, 2000, entitled "System, Method and Apparatus for Tracking Deployment of Cellular Telephone Network Sites", Inventor: Boehmke.

(Continued)

*Primary Examiner*—Melur Ramakrishnaiah
(74) *Attorney, Agent, or Firm*—Merchant & Gould

(57) ABSTRACT

A system, method and apparatus for maintaining cellular telephone network site information is disclosed. A distributed database management system may provide a user with several items of real-time information regarding a cellular telephone network site such as: cell name, cell number, location code, address, latitude/longitude, switch number, battery information (e.g., type, manufacturer, model) for all strings, building information (e.g., building and tower type, gate codes, generator information), contact information (e.g., fire, police, landlord etc.), directions to the site, facility circuit identification numbers and log entries for audits of changed data. In one embodiment, the user can be provided with emergency data associated with the telecommunication network. A common database is provided for storing the information from various entities within an organization responsible for maintaining the cellular telephone network site. Once the information is stored in a common database, it can be made available to users associated with the various entities as well as to various other computer software programs residing on the distributed system.

20 Claims, 11 Drawing Sheets

U.S. PATENT DOCUMENTS

| | | |
|---|---|---|
| 6,108,536 A | 8/2000 | Yafoso et al. .............. 455/424 |
| 6,111,857 A | 8/2000 | Soliman et al. ............ 370/254 |
| 6,131,031 A | 10/2000 | Lober et al. ................ 455/444 |
| 6,141,565 A | 10/2000 | Feuerstein et al. ......... 455/560 |
| H1921 H | 11/2000 | Fletcher et al. ............ 455/433 |
| 6,212,260 B1 | 4/2001 | Baum et al. |
| 6,233,313 B1 | 5/2001 | Farris et al. |
| 6,282,514 B1 | 8/2001 | Kumashiro |
| 6,330,312 B1 | 12/2001 | Wright et al. |
| 6,336,035 B1 | 1/2002 | Somoza et al. ............ 455/466 |
| 6,347,217 B1 * | 2/2002 | Bengtsson et al. ........ 455/67.7 |
| 6,356,758 B1 * | 3/2002 | Almeida et al. ........... 455/446 |
| 6,366,609 B1 | 4/2002 | Rossi ........................ 375/222 |
| 6,393,419 B1 | 5/2002 | Novak et al. |
| 6,408,304 B1 | 6/2002 | Kumhyr |
| 6,411,969 B1 | 6/2002 | Tam |
| 6,445,916 B1 | 9/2002 | Rahman |
| 6,504,907 B1 | 1/2003 | Farris et al. |
| 6,512,916 B1 | 1/2003 | Forbes, Jr. ............. 455/67.16 |
| 6,519,452 B1 | 2/2003 | Agostino et al. .......... 455/423 |
| 6,539,082 B1 | 3/2003 | Lowe et al. |
| 6,571,279 B1 | 5/2003 | Herz et al. ................. 709/217 |
| 6,574,464 B1 | 6/2003 | Chen |
| 6,609,100 B1 | 8/2003 | Smith et al. |
| 6,684,212 B1 | 1/2004 | Day et al. .................... 707/10 |
| 6,707,472 B1 | 3/2004 | Grauman ................... 715/752 |
| 6,725,032 B1 | 4/2004 | Sheridan et al. ........... 455/419 |
| 6,763,250 B1 | 7/2004 | Forbes, Jr. ................. 455/560 |
| 6,788,933 B1 | 9/2004 | Boehmke .................. 455/423 |
| 6,792,269 B1 | 9/2004 | Boehmke .................. 455/424 |
| 6,807,265 B1 | 10/2004 | Boehmke .............. 379/201.05 |
| 6,829,491 B1 | 12/2004 | Yea et al. ................... 455/560 |
| 2001/0032170 A1 | 10/2001 | Sheth .......................... 705/37 |
| 2001/0032263 A1 | 10/2001 | Gopal |
| 2001/0036825 A1 | 11/2001 | Martin ....................... 455/424 |
| 2001/0046230 A1 | 11/2001 | Rojas |
| 2001/0051890 A1 | 12/2001 | Burgess .......................... 705/9 |
| 2002/0067810 A1 | 6/2002 | Barak et al. |
| 2002/0072358 A1 | 6/2002 | Schneider et al. .......... 455/423 |
| 2002/0119771 A1 | 8/2002 | Boehmke et al. |
| 2002/0119786 A1 | 8/2002 | Boehmke |
| 2002/0120638 A1 | 8/2002 | Boehmke .................. 707/203 |
| 2002/0120765 A1 | 8/2002 | Boehmke |
| 2002/0123339 A1 | 9/2002 | Boehmke |
| 2002/0126822 A1 | 9/2002 | Boehmke |
| 2002/0147668 A1 | 10/2002 | Smith et al. ................. 705/30 |
| 2003/0086549 A1 | 5/2003 | Boehmke |

OTHER PUBLICATIONS

U.S. Appl. No. 09/963,151, filed Sep. 24, 2001, entitled "Method and System for Tracking Facilities Related Information", Inventor: Boehmke.

U.S. Appl. No. 09/962,423, filed Sep. 24, 2001, entitled "Method and System for Tracking the Progress of Work Orders in a Telecommunications System", Inventor: Boehmke.

U.S. Appl. No. 09/963,152, filed Sep. 24, 2001, entitled "Project List for Tracking and Validating Employee Time Allocation", Inventor: Boehmke.

U.S. Appl. No. 09/961,510, filed Sep. 24, 2001, entitled "Employee Information Directory", Inventor: Boehmke.

Borland Paradox for Windows-User Guide, 1994, Avery Denison, pp. 21 and 175-177.

Object Persistence in Object-Oriented Applications, by V. Srinivasan and D. T. Chang, 0018-8670/97/ (c) 1997 IBM (26 pages).

Office Action Summary issued Dec. 17, 2004 in connection with U.S. Appl. No. 09/963,151.

Office Action Summary issued Jan. 8, 2004 in connection with U.S. Appl. No. 09/962,423.

Office Action Summary issued Jun. 30, 2004 in connection with U.S. Appl. No. 09/962,423.

Office Action Summary issued Dec. 2, 2004 in connection with U.S. Appl. No. 09/962,423.

Office Action Summary issued Jun. 30, 2005 in connection with U.S. Appl. No. 09/962,423.

Office Action Summary issued Oct. 10, 2003 in connection with U.S. Appl. No. 09/961,510.

Office Action Summary issued Feb. 6, 2004 in connection with U.S. Appl. No. 09/961,510.

Office Action Summary issued Sep. 25, 2003 in connection with U.S. Appl. No. 09/963,152.

Office Action Summary issued Mar. 23, 2004 in connection with U.S. Appl. No. 09/963,152.

Office Action dated Dec. 17, 2004 on U.S. Appl. No. 09/963,151 (17 pages).

Office Action Summary issued Dec. 2, 2004 on U.S. Appl. No. 09/962,423 (9 pages).

* cited by examiner

FIG. 7

| System Design Plan | | | | |
|---|---|---|---|---|
| Cell | Face | Regulatory | Microwave | Reports |
| Delete | Print | | | |
| Face | Alpha | Beta | Gamma | |
| Azimuth | 0 | 120 | 240 | |
| RX Antennas | 1 | 1 | 1 | |
| RX Line Type | 1.625 | 1.625 | 1.625 | |
| Manufacturer | Andrews | Andrews | Andrews | |
| Model | PCS19HA-11015-0DG | PCS19HA-11015-0DG | PCS19HA-11015-0DG | |
| Horiz Beam Width | 110 | 110 | 110 | |
| Vert Beam Width | 5 | 5 | 5 | |
| Elect Downtilt | 0 | 0 | 0 | |
| Mech Downtilt | 0 | 0 | 0 | |
| Antenna Gain | 15 | 15 | 15 | |
| Line Loss | 1.25/100 | 1.25/100 | 1.25/100 | |
| TX Antennas | 1 | 1 | 1 | |
| Antenna Tip AGL | | | | |
| Antenna C/L AGL | 165 | 165 | 165 | |
| TX Line Type | 1.625 | 1.625 | 1.625 | |
| Manufacturer | Andrews | Andrews | Andrews | |
| Model | PCS19HA-11015-0DG | PCS19HA-11015-0DG | PCS19HA-11015-0DG | |
| Horiz Beam Width | 110 | 110 | 110 | |
| Vert Beam Width | 5 | 5 | 5 | |
| Elect Downtilt | 0 | 0 | 0 | |
| Mech Downtilt | 0 | 0 | 0 | |
| Antenna Gain | 15 | 15 | 15 | |
| Line Loss | 1.25/100 | 1.25/100 | 1.25/100 | |
| ERP w/dBm | 142 | 142 | 142 | |

| System Design Plan | | | | □ ☒ ✕ |
|---|---|---|---|---|
| Cell | Face | Regulatory | Microwave | Reports |

Survey Date: 09/25/98 — 1105
Deploy Date: 11/05/99 — 1110

Latitude ● NAD 27  DEG 027  MIN 23  SEC 11/05/99 — 1115
Longitude ● NAD 83  DEG 082  MIN 27  SEC 11/05/99 — 1120

FAA Ground AMSL: 17 — 1125
FAA Structure Height: 210 — 1130
FAA Total AMSL: 227 — 1135
FAA Study: 99.aso.0953.oe — 1140
FCC Ground AMSL: 5.18 meters — 1145
FCC Structure Height AGL: 64 meters — 1150
FCC Total AMSL: 69.19 meters — 1155
FCC Registration #: 1011628 — 1160
ASAC Study: 97-p-7534.13.513 [ASA] — 1165
EA File #: colo — 1170
489 File #: colo — 1175
Airport Direction: w — 1180
Airport Distance: 5.01 mm — 1185

● Miles  ○ Kilometers

☐ Within AM protected area   ☐ Medium Intensity Strobe   ☐ Orange/White Paint
☐ High Intensity Strobe       ☐ Red Beacons              ☐ Dual Light System

SYSTEM, METHOD AND APPARATUS FOR MAINTAINING CELLULAR TELEPHONE NETWORK SITE INFORMATION

REFERENCE TO RELATED APPLICATION

This is a continuation-in-part of U.S. patent application Ser. No. 09/746,502, entitled "SYSTEM, METHOD AND APPARATUS FOR TRACKING DEPLOYMENT OF CELLULAR TELEPHONE NETWORK SITES", filed Dec. 22, 2000, which is incorporated by reference herein.

TECHNICAL FIELD

The system, method and apparatus relate generally to telecommunications. More particularly, the system, method and apparatus relate to maintaining cellular telephone network site information.

BACKGROUND OF THE INVENTION

Related art systems provide data and processes, such as computer software programs, multiple databases, spreadsheets and other files that are not interrelated, interconnected or in communication with each other. Accordingly, users of such data and processes on a distributed network are unable to execute the software programs and access the data on a real-time basis. For example, such users are unable to access modifications to the data or upgrades to the software programs. Furthermore, such users are unable to access changes to data which may have an effect on the user's function or processes made by others, on a real-time basis. There is a need for a system that provides real-time access to a network-organized repository of data and processes, such as software programs, within a distributed data and processes information system.

There is a need for a system that obtains information regarding the deployment of cellular telecommunication sites on a real-time basis. For example, related systems are generally not updated with current information until a deployment project team meets at periodic intervals. In the meantime, deployment project team members are generally unaware of the status of the deployment project until a meeting is held. Accordingly, there is a need for a real-time process that is able to provide deployment project members with real-time up-to-date project information substantially instantaneously once it is entered into the process. Furthermore, there is a need for a process that eliminates the need for maintaining and updating separate databases spread out across various project teams.

SUMMARY OF THE INVENTION

In different embodiments, the invention comprises a system, method and apparatus for maintaining cellular telephone network site information. A distributed database management system may provide a user with several items of real-time information regarding a cellular telephone network site such as: cell name, cell number, location code, address, latitude/longitude, switch number, battery information (e.g., type, manufacturer, model) for all strings, building information (e.g., building and tower type, gate codes, generator information), contact information (e.g., fire, police, landlord etc.), directions to the site, facility circuit identification numbers and log entries for audits of changed data. In one embodiment, the user can be provided with emergency data associated with the telecommunication network. A common database is provided for storing the information from various entities within an organization responsible for maintaining the cellular telephone network site. Once the information is stored in a common database, it can be made available to users associated with the various entities as well as to various other computer software programs residing on the distributed system.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 7 is an illustration of a system design plan main menu in accordance with an embodiment of the present invention with a face tab selected.

FIG. 8 is an illustration of a system design plan main menu in accordance with an embodiment of the present invention with a regulatory tab selected.

FIG. 11 is an illustration of a display screen displaying a report to the user in accordance with an embodiment of the present invention.

DETAILED DESCRIPTION

Figure 1:
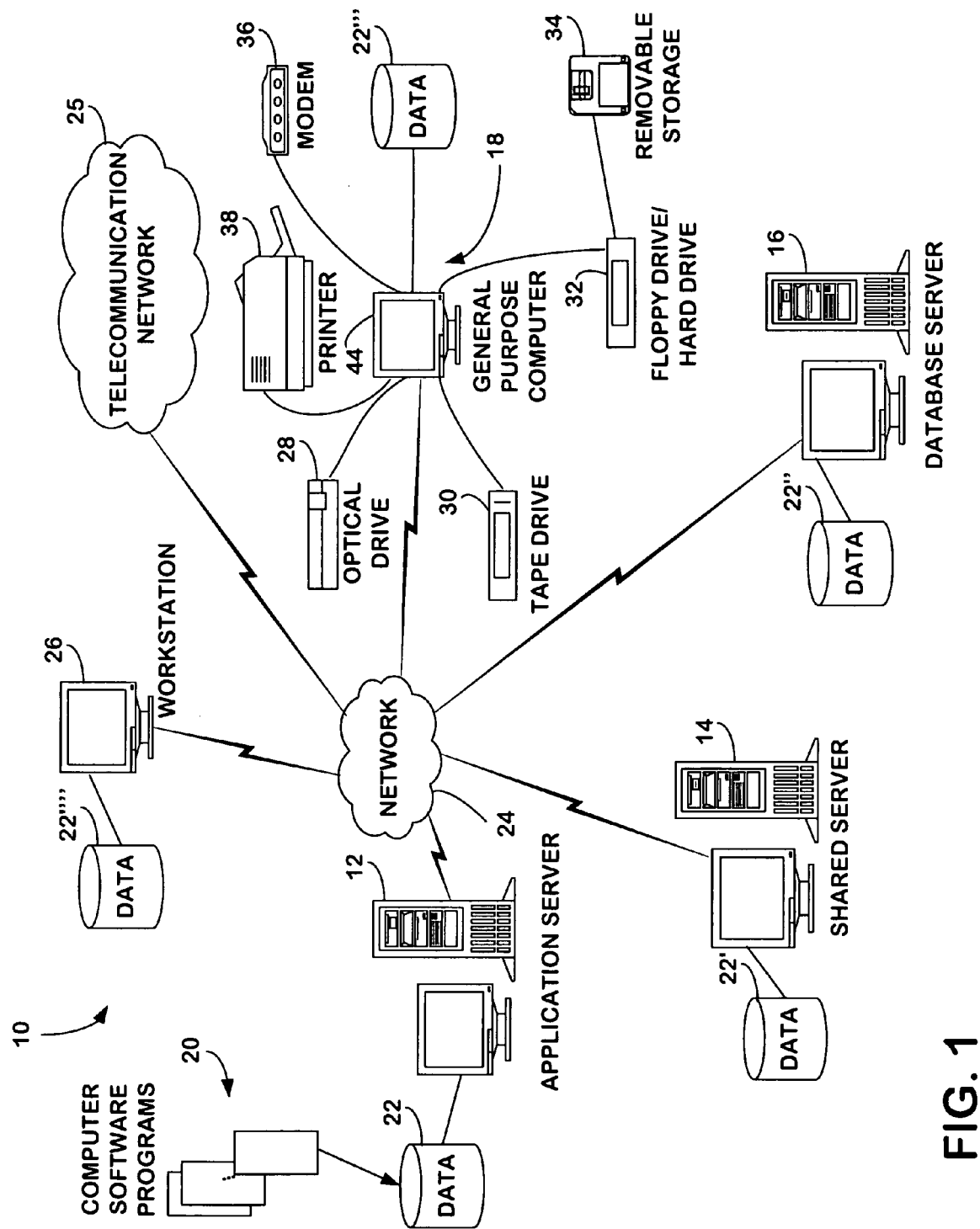
FIG. 1 illustrates one embodiment of a competing system having one or more computers in communcation via a network to perform logical operations.

The present invention, in different embodiments, is directed to a system, method and apparatus for maintaining cellular telephone network site information. A distributed database management system may provide a user with several items of real-time information regarding a cellular telephone network site such as: cell name, cell number, location code, address, latitude/longitude, switch number, battery information (e.g., type, manufacturer, model) for all strings, building information (e.g., building and tower type, gate codes, generator information), contact information (e.g., fire, police, landlord etc.), directions to the site, facility circuit identification numbers and log entries for audits of changed data. In one embodiment, the user can be provided with emergency data associated with the telecommunication network. A common database is provided for storing the information from various entities within an organization responsible for maintaining the cellular telephone network site. Once the information is stored in a common database, it can be made available to users associated with the various entities as well as to various other computer software programs residing on the distributed system.

Referring now to the drawings, in which like numerals represent like elements throughout the several figures, aspects of the present invention will be described.

Distributed Information System for Data and Processes

The distributed information system for data and processes in accordance with one embodiment of the invention includes one or more databases and processes, such as computer software programs, that share a common database. In one embodiment, the distributed information system for data and processes can utilize a structured query language (SQL) common database for providing a distributed database management system. For example, a MICROSOFT SQL™ server can be used to provide a common database function whereby a plurality of general-purpose computers in communication with the SQL server can carry out the manipulation of data stored on the SQL server while the SQL server performs other operations associated with the distributed database management system. Those skilled in the art will appreciate that the SQL server can be coupled to or be in communication with one or more storage devices for storing data or computer software programs. In accordance with one embodiment of the invention, any changes that are made to a particular set of data by the one or more computer software programs in one process, or by one or more users, are reflected into and are accessible by other computer software programs within the distributed information system on a real-time basis.

Referring now to FIG. 1, where one embodiment of one set of components that can be used to carry out the system, method and apparatus is illustrated in diagram form. In one embodiment, the system components comprising the distributed information system 10 include an application server 12, a shared server 14, a database server 16, a general-purpose computer 18 and a workstation 26. The application server 12 provides access to one or more computer software programs 20 stored therein or stored in a database 22 in communication with the application server 12. Further in one embodiment, the application server 12 is in communication with one or more other components of the other distributed information system 10, such as the shared server 14, the database server 16, the general-purpose computer 18 and the workstation 26, for example. The one or more system components also can communicate with each other via well-known communications hardware and software. Still further in one embodiment, the one or more system components can be interconnected in a network 24 configuration in accordance with various well-known network topologies. For example, the components of the distributed information system 10 can be interconnected in a bus topology, ring topology, a star topology or combinations thereof. Those skilled in the art will appreciate that any one of these network topologies, or combinations thereof, can provide an adequate implementation of the system, method and apparatus.

The general-purpose computer 18, the shared server 14, the database server 16 and the workstation 26 can each execute the computer software programs 20 stored in the application server 12 or programs that are stored in the database 22 depending on the specific implementation. In one embodiment, the general-purpose computer 18 can perform the function of the workstation 26 or other computing systems without departing from the scope of the invention. Those skilled in the art will appreciate that the general-purpose computer 18 can be provided with various peripherals in communication with or coupled thereto. For example, the general-purpose computer 18 can be coupled to an optical disk drive 28 for reading and writing instructions or data to be used by the general-purpose computer 18. Moreover, a tape drive 30 can be coupled to the general-purpose computer 18 for storing data and processes for backup purposes, for example. In addition, a storage device 32, such as a floppy disk drive or hard disk drive can be coupled to the general-purpose computer 18 for storing instructions and data to be used by the general-purpose computer 18. Instructions and/or data can be provided to the general-purpose computer 18 via a removable storage medium 34. A communication device 36 such as a modem can also be provided with the general-purpose computer 18 to serve various communication purposes. Also, an output device 38, such as a printer, or a monitor 44, can be provided in communication with or coupled to the general-purpose computer 18 for providing the user with reports and the like.

In use, a user operating the general-purpose computer 18 sends a request to access the one or more computer software programs 20 from the application server 12. Such computer software programs 20 can then be delivered to the general-purpose computer 18, the shared server 14, the database server 16 or the workstation 26 for execution thereof. Accordingly, any changes that are made by the user operating the general-purpose computers 18 in communication with the network 24 to any of the programs 20 or data residing within the databases 22 distributed throughout the distributed information system 10, will be available and accessible by the other system components and users. Those skilled in the art will appreciate, that if more than one general-purpose computers 18 are interconnected in a network 24, changes to the database 22 made by one user operating one general-purpose computer will be available and accessible to any other user operating any other general-purpose computer 18 in communication with the network 24 on a real-time basis (e.g., substantially instantaneously).

One embodiment of a hardware environment of a general-purpose computer 18, a distributed information system 10, a telecommunication switch and a switch-master, whereby the instructions of computer software program 20 can be executed by, or interact with, are described below. Furthermore, specific embodiments of the computer software programs 20, such as program 20 for receiving and capturing call processing failures and digital cellular switch failures, communicating and managing telecommunication call records, obtaining real-time information associated with a network and tracking the deployment of telecommunication network sites on a real-time basis also are described below.

General-Purpose Computer

Figure 2:
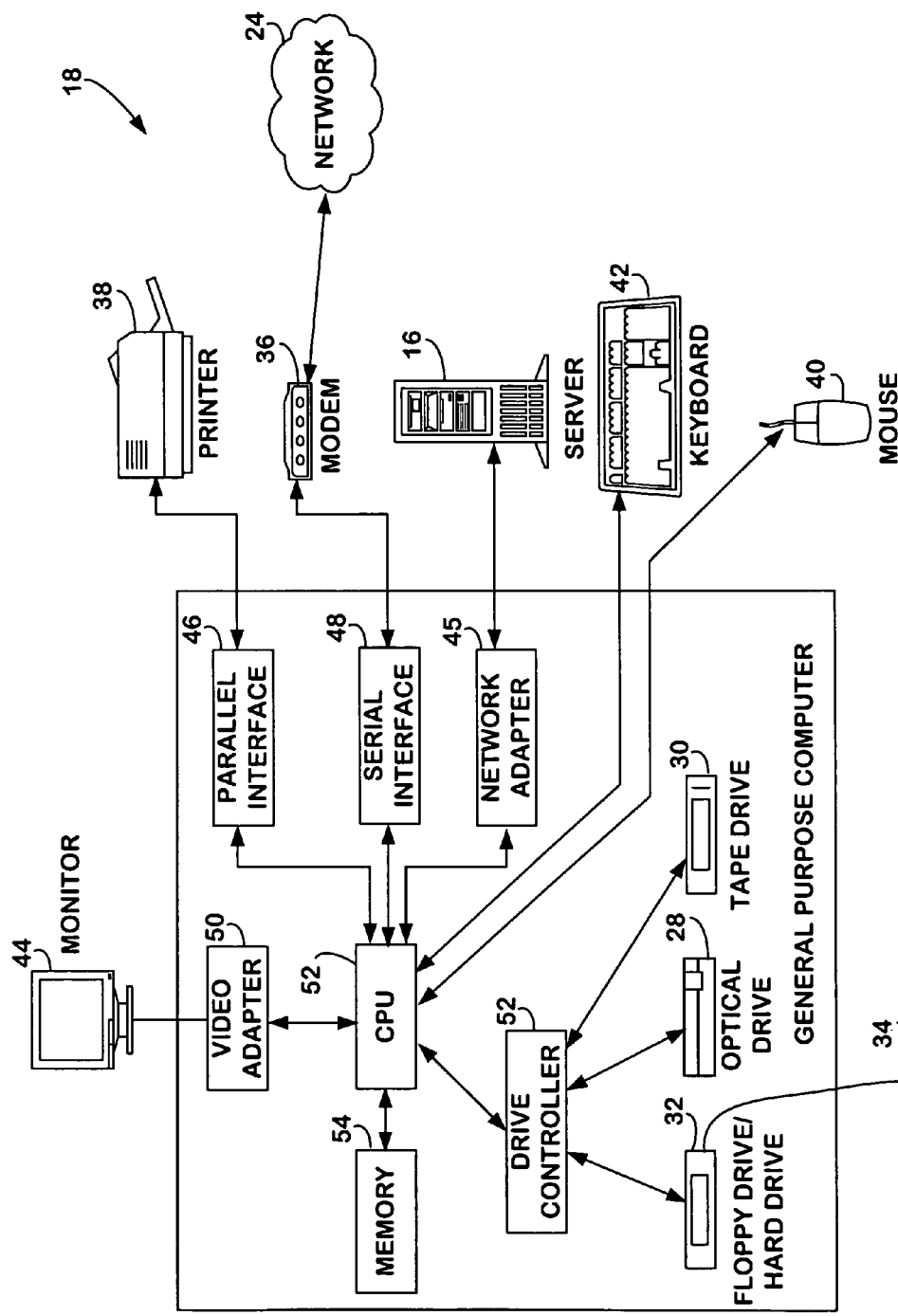
FIG. 2 illustrates one embodiment of a hardware environment of a general purpose computer to perform the logical operations.

Referring now to FIG. 2, one embodiment of a hardware environment of a general-purpose computer 18 provided for executing one or more computer software program 20 instructions is shown in diagram form. The general-purpose computer 18 can be, for example, an IBM-compatible computer that operates under the control of a number of operating systems. For example, the general-purpose computer 18 may operate under a DOS, OS/2, WINDOWS, WINDOWS NT, UNIX, XENIX, LINUX or PICK operating system, among others that are generally well known to those skilled in the art.

In one embodiment, the general-purpose computer 18 can include one or more peripherals that are coupled to or are in communication with the general-purpose computer 18. For example, the general-purpose computer 18 can include several input devices such as a mouse 40 or a keyboard 42. Furthermore, the general-purpose computer 18 can include several output devices such as a monitor 44, a printer 38 or a plotter. In addition, the general-purpose computer 18 can include several communication devices such as, for example, a modem 36.

The general-purpose computer 18 can also be adapted to be coupled to or in communication with one or more other general-purpose computers distributed throughout the distributed information system 10. For example, the one or more general-purpose computers can be interconnected or configured as a network 24. As discussed above, the network topology can be a bus topology, a ring topology, a star topology or combinations thereof without departing from the scope of the invention. Those skilled in the art will appreciate that any one of these network topologies, or combinations thereof, can provide an adequate network implementation for the system, method and apparatus. Still other peripherals may be coupled to the general-purpose computer 18 such as, for example, a storage device 32 such as a hard disk drive or floppy disk drive, an optical disk drive 28, a tape drive 30 and the like. Those skilled in the art will appreciate that the above list of peripherals is not exhaustive and that other peripherals may be utilized in conjunction with the general-purpose computer 18 without departing from the scope of the invention.

The general-purpose computer 18 also can include several other components known generally to those skilled in the art as the motherboard, interfaces, adapters and controllers. For example, a network adapter 45 may be utilized to provide a communication means or to couple the general-purpose computer 18 to one or more other general-purpose computers, one or more workstations, or one or more mainframe computers or servers distributed throughout the distributed information system 10. Also, a parallel interface 46 may be provided for coupling the general-purpose computer 18 to various printers 38 and plotters. Furthermore, a serial interface 48 may be provided for interfacing a communication device, such as a modem 36 to the general-purpose computer 18. In addition, a video graphics adapter 50 may be utilized to couple the general-purpose computer 18 to the monitor 44. Moreover, a storage device controller 52, e.g., a hard disk drive controller, a floppy disk drive controller or an optical disk drive controller, may be utilized for controlling the hard disk/floppy disk drive 32, the optical disk drive 28, and the like.

The motherboard of the general-purpose computer can include one or more central processing units 52 and one or more memory devices 54 for storing the instructions of software programs to be executed by the central processing unit 52 for carrying out a particular algorithm or function. The one or more central processing units 52 may be custom manufactured for a specific application at hand, or may be selected from a wide variety of processors and controllers that are generally available on the market and well known to those skilled in the art. For example, single chip or multi-chip processors manufactured by the INTEL CORPORATION including the 8051, 80386, 80486, PENTIUM and PENTIUM PRO family of processors can be used. In addition, single chip or multi-chip processors manufactured by the MOTOROLA CORPORATION including the MC68000 band MC68040 can be utilized. Further, various clones of the above listed processors that are readily available on the market can be used. For example, processors manufactured by ADVANCED MICRO DEVICES (AMD), CIRYX, C&T and IBM can be readily adapted and utilized as the central processing unit 52 for the general-purpose computer 18.

The general-purpose computer 18 can also act as a workstation 26 whether it be in a standalone configuration or interconnected in the network 24. In addition, workstations 26 requiring additional performance may utilize reduced instruction set computing (RISC) architecture processors and one or more SPARC central processing units 52 such as those manufactured by SPARC INTERNATIONAL, INC., SUN MICROSYSTEMS, INC., the POWER PC™ by MOTOROLA, the AMD 29000™, and the like.

Memory devices 54 such as random access memories (RAM), read only memories (ROM) and erasable programmable read only memories (EPROM) are generally used for storing the instructions of the software programs 20 to be executed by the central piocessing unit 52 of the general-purpose computer 18 for carrying out specific algorithms or functions. These memory devices 54 are well known to those skilled in the art and are available in a wide range of configurations and from a wide variety of manufacturers. Those skilled in the art will appreciate and recognize that the above recitation of central processing units 52 and memory devices 54 is not exhaustive and that others may be substituted without departing from the scope of the invention.

Network Organized Repository of Data

Figure 3:
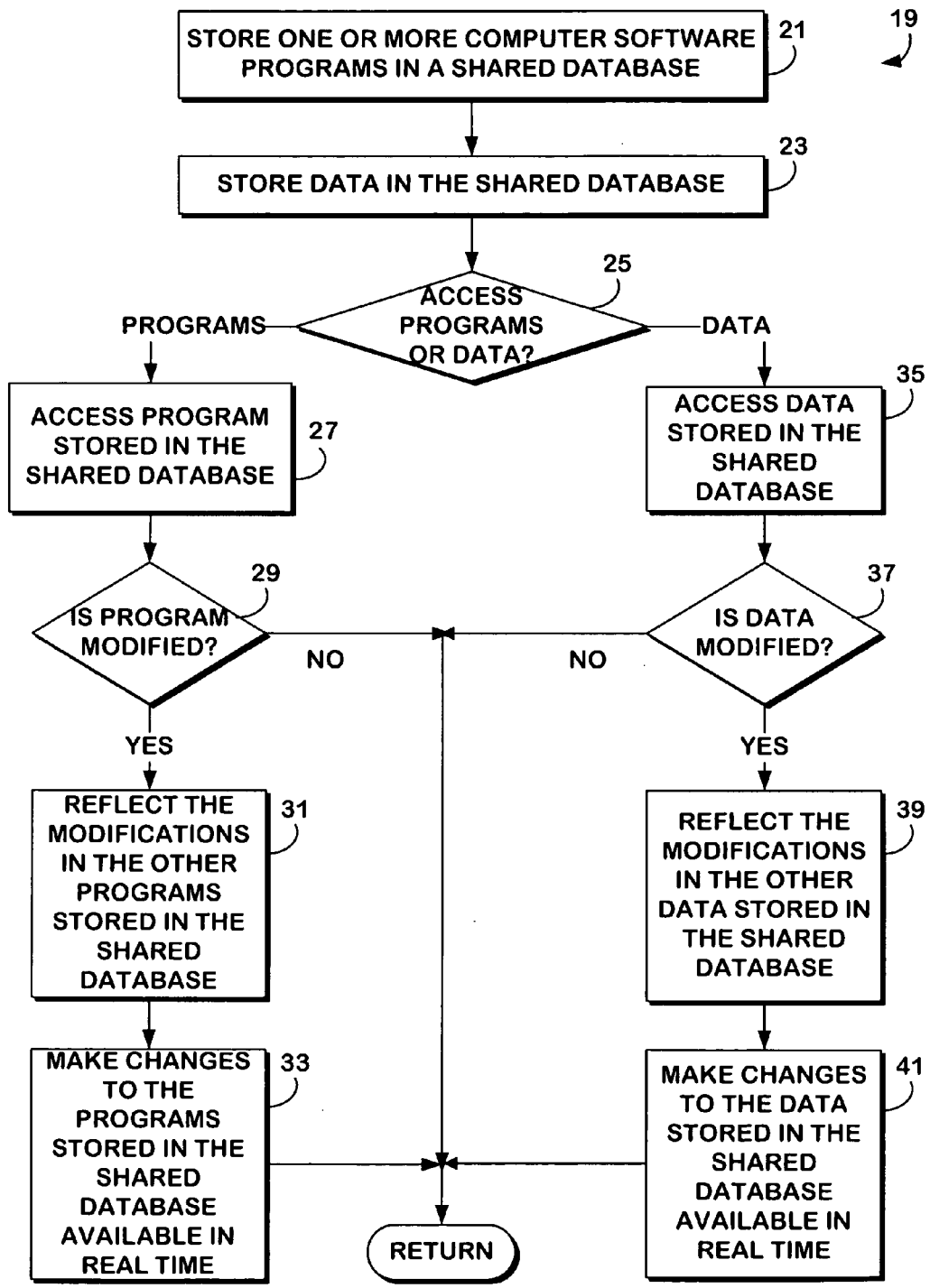
FIG. 3 illustrates one embodiment of a logic flow diagram.

Referring now to FIG. 3, where one embodiment of a logic flow diagram 19 of a network organized repository of data is shown in logic diagram form. At logic block 21, one or more computer software programs 20 are stored in a shared database 22. At logic block 23, data are also stored in the shared database 22. At decision block 25, it is determined whether a user, a process or a computer has requested access to the programs 20 or data that are stored in the shared database 22. If access to the programs 20 is requested, at logic block 27 the user is permitted access to a selected program 20 stored in the shared database 22. At decision block 29, it is determined whether the user has modified the program 20. If the program has not been modified, the logic flow returns to the previous process. However, if the selected program 20 is modified in any way, at logic block 31, any changes or modifications that are made to the program 20 are reflected in the other programs 20 that are stored in the database 22. Furthermore, at logic block 33, the changes made to the programs 20 stored in the database 22 are made available to every other program on the distributed information system 10 on a real-time basis.

If, at logic block 25, access to data is requested, at block 35 the user is provided with access to the data stored in the database 22. If the data are modified, as determined at block 37, at block 39 the modifications made to the requested data are reflected in all other data stored in the database 22. At block 41, the changes made to the data stored in the database are made available on the distributed information system 10 on a real-time basis.

Telecommunication Distributed Database Management System

Figure 4:
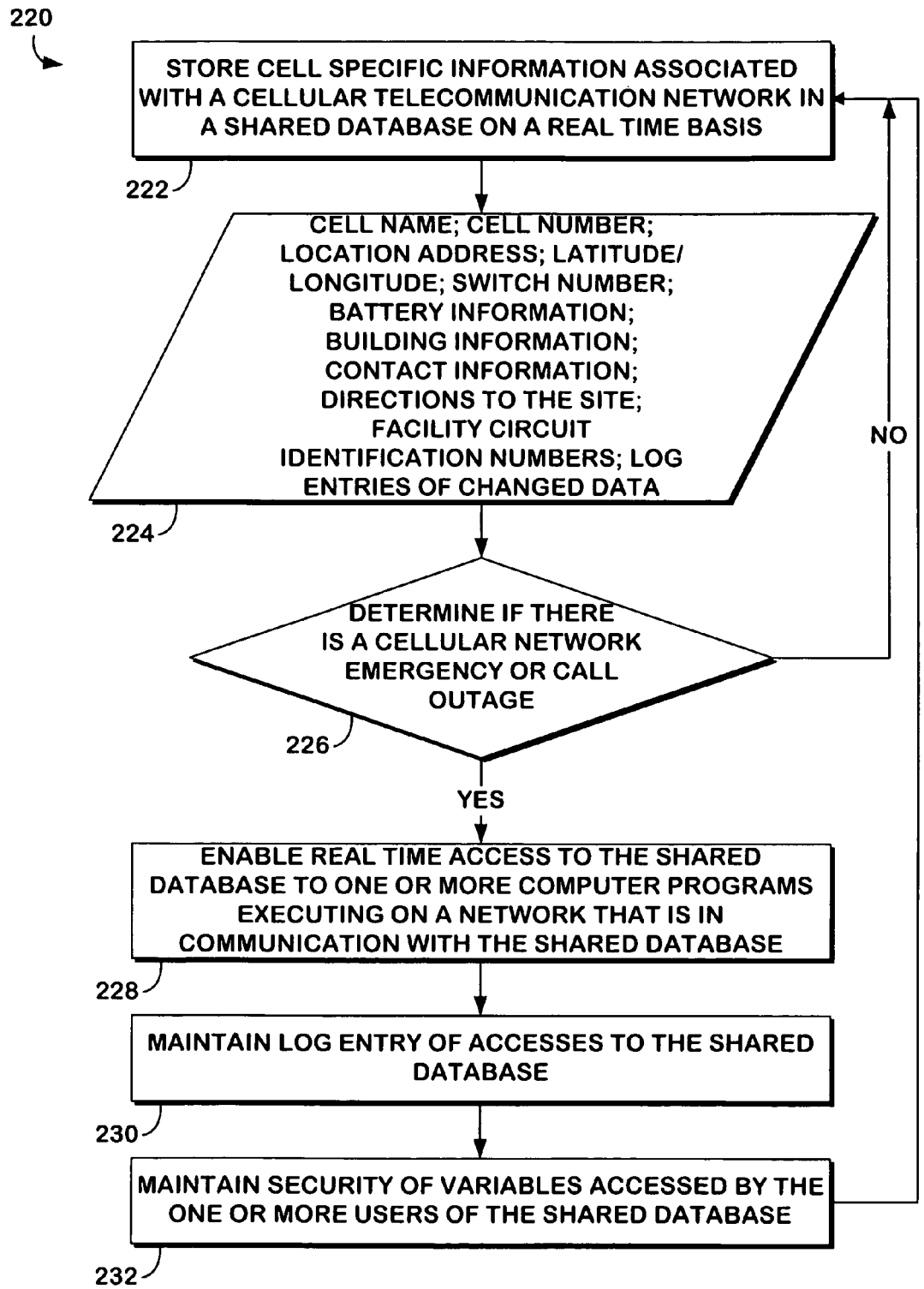
FIG. 4 illustrates one embodiment of a logic flow diagram for obtaining information associated with a telecommunication system.

Referring now to FIG. 4, where one embodiment of the distributed information system 10 is illustrated which can be utilized as part of a telecommunication distributed database management system 56. In one embodiment, the general-purpose computer 18 can be in communication with one or more other general-purpose computers configured and adapted as the database server 16 component of the telecommunication distributed database management system 56. The database server 16 can be configured as a distributed database management server for creating, maintaining and viewing database data. Those skilled in the art will appreciate that, in addition to the data, the database 22" can also include one or more computer software programs 20 therein.

In one embodiment, the database server 16 of the telecommunication distributed database management system 56 can utilize a structured query language (SQL) database for creating, viewing and maintaining database data. MICROSOFT, ORACLE, GUPTA, INFORMIX, POWERSOFT, ORACLE and SYBASE can all supply SQL databases, for example. Accordingly, the database server 16 can implement an SQL database server such that one or more general-purpose computers 18, workstations 26 or other servers can access and manipulate the data stored in the database 22" that is accessible by the database server 16. In addition, the database server 16 can manage and coordinate the data stored in the database 22 while also performing calculations locally. For example, as discussed above, the database server 16 can be comprised of a general-purpose computer 18 or workstation 26 that includes one or more central processing units 52 for executing instructions according to one or more software programs 20 and a memory 54 for storing such instructions. The database server 16 also can be configured and adapted to perform additional functions and execute additional algorithms in addition to manipulating data within the database 22".

For example, in one embodiment, the database server 16 can execute instructions of a software program 20 for carrying out tasks such as managing the storage and retrieval of database 22" data, generating reports, displaying data, transmitting data to one or more peripheral devices such as printers 38, plotters, facsimiles, modems 36 and other similar devices. In addition, in one embodiment, the database server 16 can execute instructions of one or more software programs 20 for carrying out tasks such as transmitting database data or specific reports to one or more other general-purpose computers 18 or workstations 26 that are in communication therewith.

Further, in one embodiment, the database server 16 can execute instructions of one or more software programs 20 for carrying out tasks such as communicating database 22" data or reports to one or more other computer software programs 20 whose instructions are executed on other general-purpose computers across the telecommunication distributed database management system 56. In addition, the database server 16 can execute instructions of one or more software programs 20 for carrying out tasks such as sending database data or reports to a network address or electronic mail (e-mail) address in response to a query or in response to a predetermined set of conditions. Still further in one embodiment, the database server 16, or for example any one of the one or more general-purpose computers 18 in communication with the network 24, can execute instructions of a software program 20 for carrying out the function of broadcasting a wireless signal to be received by one or more users carrying a wireless device or to be received by other devices having incorporated therein a device in response to a predetermined set of conditions. Those skilled in the art will appreciate that the wireless device can be, for example, a pager receiving a paging signal. Those skilled in the art will recognize that the above-enumerated tasks to be performed by the database server 16 can be performed by other components within the telecommunication distributed database management system 56. Also, such tasks are illustrative in nature and are not intended to limit the scope of the invention.

Representative Computer Software Program Applications

In one embodiment, there can be a plurality of instructions associated with a plurality of software programs executing in VISUAL BASIC Version 5 or 6 throughout the system 56, for example. The general-purpose computer 18 initially executes the instructions of a software program ("DB_LIDE" hereinafter) in order to carry out the function of establishing a communication connection between the general-purpose computer 18 and the server 16. The instructions are provided in native code of the general-purpose computer 18 directly to the server 16. The DB_LIDE program does not go through an Open Database Connectivity (ODBC) and provides an efficient way of accessing the server 16.

Obtaining Real-time Information Associated with a Cellular Telephone Network

Referring now to FIG. 4, where one embodiment of a logic flow diagram 220 for obtaining real-time information associated with a telecommunication network 25 is illustrated in block diagram form. At block 222, cell site 86 specific information associated with a telecommunication network 25 is stored in a shared database 22 on a real-time basis. For example, at block 224, a list of the type of cell site 86 specific information is listed. The cell site 86 specific information illustrated in block 224 includes the cell name, the cell number, the location code, the address, the latitude/longitude, the switch number, the battery information, the building information, the contact information, directions to the site, the facility circuit identification numbers and log entries of any changed data, for example.

Once the information enumerated in block 224 is stored in the shared database 22 as indicated in block 222, at decision block 226 a determination is made as to whether there exists across the telecommunication network 25 an emergency or a call outage. If there is no emergency or call outage, the program will continue to store any new cell site 86 specific information associated with the telecommunication network 25. If, at block 226, it is determined that there is an emergency or call outage, at block 228 the system 56 enables real-time access to the shared database 22 thereby allowing one or more computer programs 20 that are executing on the system 56. At block 230, the system 56 maintains a log entry of any accesses that are made to the shared databases 22 by the various computer programs 20. At block 232, as variables are accessed by the one or more users of the shared database 22, a certain level of security is maintained by the system 56.

One embodiment of the distributed database management system 56 can provide a user with several items of information as will be described below in the section describing maintaining cellular telephone network site information.

Tracking the Deployment of Cellular Telephone Network Sites in Real-time

One embodiment of the invention is a system, method and apparatus for obtaining real-time information associated with the deployment of cellular telecommunication network sites. The system, method and apparatus provide a user with information regarding the deployment of cellular telecommunication network sites across a geographic region on a real-time basis.

Generally, one or more users are provided with up-to-date, real-time project information that would otherwise not be available to them. With related art systems, methods and apparatuses, the one or more users would generally meet in person in order to discuss changes to be implemented in a cellular telecommunication network site deployment project, but at the meeting they would not have up-to-date real-time information regarding the cellular telecommunication network site deployment project status. Also, team members of other groups would not necessarily know or have up-to-date information of the progress being made on a particular project by another group. One embodiment of the real-time software program provides the one or more users with the means for inputting information in a common database 22 and executing one or computer software programs 20 for tracking changes, progress and performance of a specified cellular telecommunication network site deployment project on a real-time basis.

Although there are commercially available project management computer software programs, for example MICROSOFT PROJECT™, such programs have shortcomings. The MICROSOFT PROJECT™ software program, for example, does not provide the necessary features that are required for tracking the deployment of cellular telephone network sites on a real-time basis. For example, there are various features of the deployment process described below such as the ability of interacting by way of e-mail messaging and providing information on a real-time basis such that when a user invokes the deployment software program and looks at a particular date, the user will know that the information is being provided on a real-time basis and is up-to-date.

The deployment project software program described herein reduces the amount of time required for tracking the progress of new cellular telecommunication network site deployments, as well as tracking the progress of any changes being made to existing cellular telecommunication network sites. One embodiment of the deployment project software program provides a computer software program for tracking changes to deployment project timelines through the use of color-coding and providing summary level information about the deployment project to the user. The deployment software program is capable of managing changes to the deployment in a dynamic way. Accordingly, the computer software program provides instant, real-time access, to date changes within the project plan, who made those changes and when the changes were made.

One embodiment includes a feature providing color-coding to indicate at a glance when project parameters have been modified from a previous setting. For example, dates that are modified from a previous reset or modification may be shown to the user in several different colors. Dates that have been pulled in (e.g., the project task has been shortened) can be shown in green. Dates that have been pushed out (e.g., the project task has been lengthened) can be shown in red. Dates that have not changed may be shown in black. Those skilled in the art will appreciate that these are but a few examples of a color-coding scheme and should not be considered as a limiting feature of the invention as many color-coding schemes may be employed in order to visually alert the user that a project parameter has been modified without departing from the scope of the invention.

The color-coding scheme provides to the individual users an acknowledgment of date changes, thereby allowing the user to make a quick identification of any new changes that were made to the project plan because the user last glanced at the project plan. The system also provides the user with any prior activity information by merely placing the cursor on the desired field. The system also can provide detailed log entries of any changes showing the field name, the old value, the new value, the time/date stamp and the individual user who made the change. Furthermore, the system also can provide customized reports including a detailed company report showing completed dates and changed dates using shading and highlighted boxes for quick identification, providing user definable date field titles in all tracking modules and user definable filters. Moreover, the system also can automatically provide priority renumbering upon changes in project priority; automatically sending e-mail messages upon dates being marked completed or changed by a user automatically populating dates downstream based upon predefined time intervals; and allowing sub-dates that can or cannot be forced prior to the marking of the main completion date.

Another feature provides the capability of tracking the performance of a cellular telecommunication network site and also provides the capability of tracking the performance of any active projects associated therewith. Also, another feature can provide a centrally accessible repository of project data, thereby eliminating the need to keep and maintain individual databases, spreadsheets and the like.

Furthermore, the deployment project software program can track a variety of information regarding when the information was exchanged. Also, the deployment project software program can provide automatic down streaming, such that if a user changes a date, the program has the ability to automatically change the dates downstream of the modified dates. Moreover, the deployment project software program also can send the user e-mail messages upon the occurrence of a predetermined event associated with the deployment project plan. For example, if a particular date upstream of the current date is changed or the deployment at a particular site is complete, the program sends an e-mail message to the user's e-mail address informing the user that such an event occurred. In addition, rules can be provided in order to prevent certain dates from being marked as being complete. Also, there are certain functions that cannot take place unless other information has been provided to the database 22 in order to keep the database 22 up to date and to ensure that up to date addresses, phone numbers and zip codes are available to the program.

Maintaining Cellular Telephone Network Site Information

One embodiment of the distributed database management system 56 can provide a user with several items of information regarding a cellular telephone network site. For example, the user can be provided with real-time information associated with a telecommunication network such as: cell name, cell number, location code, address, latitude/longitude, switch number, battery information (e.g., type, manufacturer, model) for all strings, building information (e.g., building and tower type, gate codes, generator information), contact information (e.g., fire, police, landlord etc.), directions to the site, facility circuit identification numbers and log entries for audits of changed data. In one embodiment, the user can be provided with emergency data associated with the telecommunication network.

Various entities such as people, groups and departments within a company generally maintain information relating to their specific business area in their own spreadsheets and databases. In order to consolidate the information from these various entities, a common database 22 is provided for storing the information from the various entities. Once the information is stored in a common database 22, it can be made available to users associated with the various entities as well as to various other computer software programs 20 residing on the system 56. Accordingly, a software program that is executing somewhere on the system 56 will automatically pick up information that would normally be stored in separate, inaccessible, storage devices associated with each entity. For example, if the user enters an address into the system 56, the computer software programs will automatically pick up that address on a real-time basis. In addition, providing a common database 22 allows the system 56 to maintain a certain level of security. For example, users that are responsible for an address will still be able to access that address without other users overriding their settings.

If the user selects cell numbering, a cell number will be provided. Furthermore, the user can look for a particular site by selecting that option or clicking on an icon displayed on a system 56 output device. Accordingly, the system 56 will provide the user with the name of the cell site, the number of the cell site, the location code of the cell site, the last time the code was modified, the company number, the switch 58 that the cell site is located in, who the responsible field engineer is, address, city, state, zip, latitude, longitude and the facility information associated with that cell site. Those skilled in the art will appreciate that "facilities" are provided to make a connection between the cell site and the switch 58 for various data links, such that the switch 58 can communicate with the cell site 86. Moreover, the system will provide the user with information that can be retrieved from other computer software programs 20, for example a facility management program. Those skilled in the art will appreciate that the above list is not exhaustive and should not be considered as limiting the invention. Those skilled in the art will appreciate that the information can be initially populated in a table 100 from a common table 100 that is shared by all the computer software programs throughout the system 56.

For example, if the user selects to review generator or battery information of a particular cell site 86, the system 56 will provide the user with information associated with the generator and the battery. One embodiment of the system 56 provides the user with a string for identifying a 24-volt battery including the battery type, the battery manufacturer, the battery model number, the number of active cells there are and where they are physically located. The same information can be provided in a string for identifying a 48-volt battery.

If the user selects to review building information of a particular cell site 86, the system will provide the telephone information, the building type, the company number, the tower type, whether there is a gate at the tower, the gate key, if there is a gate key, and if there is, whether there is a gate code. In addition, the system can provide different types of information about the generator, fuel loads and the like.

If the user selects to review contact information relating to a particular cell site 86, the system will provide police, fire, water, Federal Aviation Administration (FAA), gas company, landlord and electric company contact information, the meter number, the account and various other pieces of contact information. In addition, the system can provide the name of the RF Engineer, the name of the Cell Manager and the like. In addition, the system provides logging and tracking of data associated with a particular cell site 86 in case there is ever a need to roll back the data. Moreover, a complete history of a particular cell site 86 can be provided to the user. The information discussed above is by no means exhaustive. For example, the system can provide additional pieces of information associated with a particular cell site 86 such as maintenance of routine history, the last time the generator was run, the last time the generator was inspected, when the warranty will expire and the like. Therefore, from one software program 20, the user can obtain a variety of information about a particular site.

The system 56 also provides information associated with telecommunication facilities that go from the switch 58 to the cell site 86 for the data links so that they can communicate with each other. In addition, the system 56 provides information about telecommunication facilities that actually pass through the cell site 86 or another site in the telecommunication system 25. With respect to any one of the telecommunication facilities, for example microwave facilities, the user can identify by the numbers any telecommunication facilities that pass through, terminate or originate at a particular cell site 86. The user also can be provided with a map of the state and will be able to zoom in and see all of the telecommunication facilities on the screen of the output device. The user can then access these facilities by clicking on the respective icons or images displayed on the output device.

The user can select a built-in query generator. Accordingly, the system provides the user with all the information associated with the query value. For example, if the user queries the system 56 for cell sites 86 where the field engineer meets certain criteria, the system 56 will provide the user with a list of all the current field engineers as well as those who have left or have gone to different cities, but are still maintained in the database 22.

The system also provides reports. For example, referring to a cell site 86, the system will print a report of a majority of the information associated with that particular cell site 86 and place it into one form. The report provides the user with values such as the cell location, the field engineer, the building information, the generator information and the like. In order to print the reports, the output can be directed to print the report to the screen, a printer or plotter depending on which output device happens to be selected by the user.

Also, the system provides the telecommunication facility identification numbers and a variety of other miscellaneous information. The user can access this information either on a per-cell site basis or the user can print them all at one time. Those skilled in the art will appreciate that all of the information described above is available to the user on a real-time basis. For example, another software program that is being executed on the system will be able to identify any changes that are made in the database 22 on a real-time basis.

Figure 5:
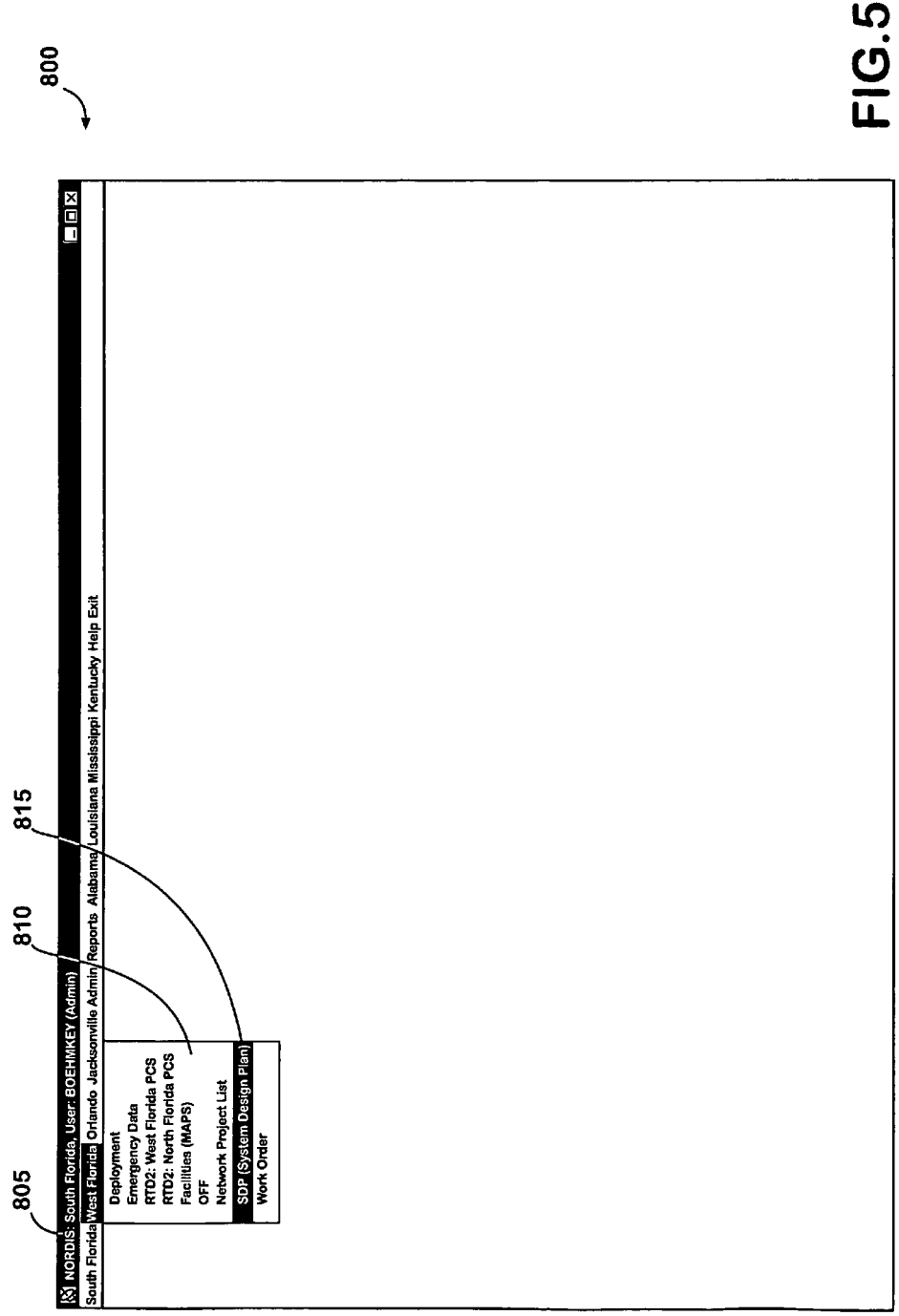
FIG. 5 is an illustration of a distributed information system main menu in accordance with an embodiment of the present invention.

Referring now to FIG. 5, an illustration of a user accessing a system design plan software application 20 via the distributed database management system 56 will be described. The system design plan software application may display much of the information described above for a particular cellular telecommunications network site. The system, method and apparatus provide a user with information regarding the maintenance of cellular telecommunications network sites across a geographic region on a real-time basis. The distributed information system main menu 800 includes a plurality of region fields 805. The user may select one of these region fields 805 to access different functionality for a particular region. For example, as illustrated in FIG. 8, the user has selected the West Florida region field. After selecting one of the region fields 805, a drop down menu 810 is displayed to the user. To access the system design plan software application 20, the user selects drop down menu selection 815 entitled SDP (System Design Plan). After selecting the SDP software application 20 via the drop down menu selection 815, the SDP software application 20 displays a SDP main menu 900 to the user as illustrated in FIG. 6.

Figure 6:
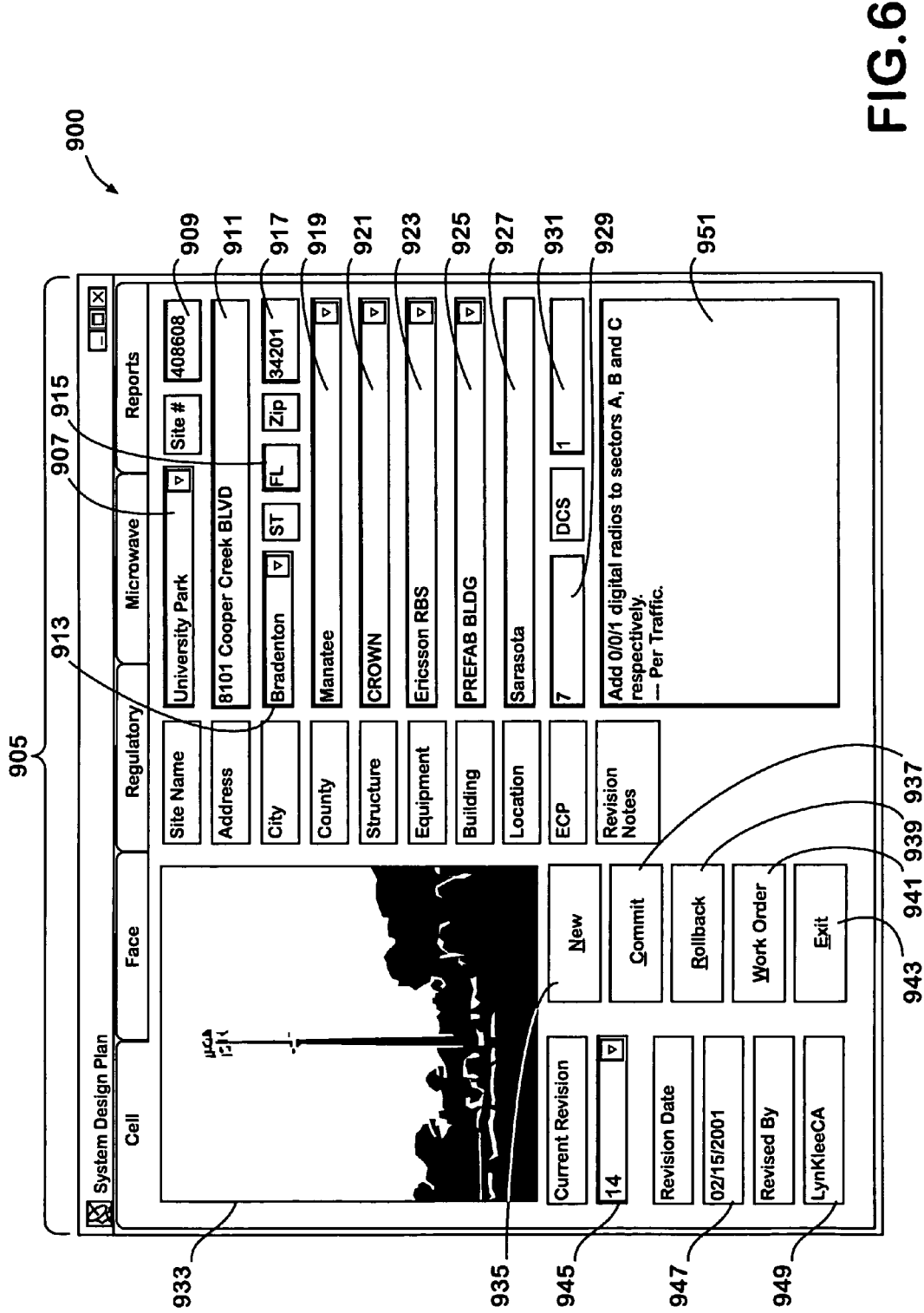
FIG. 6 is an illustration of a system design plan main menu in accordance with an embodiment of the present invention with a cell tab selected.
Figure 9:
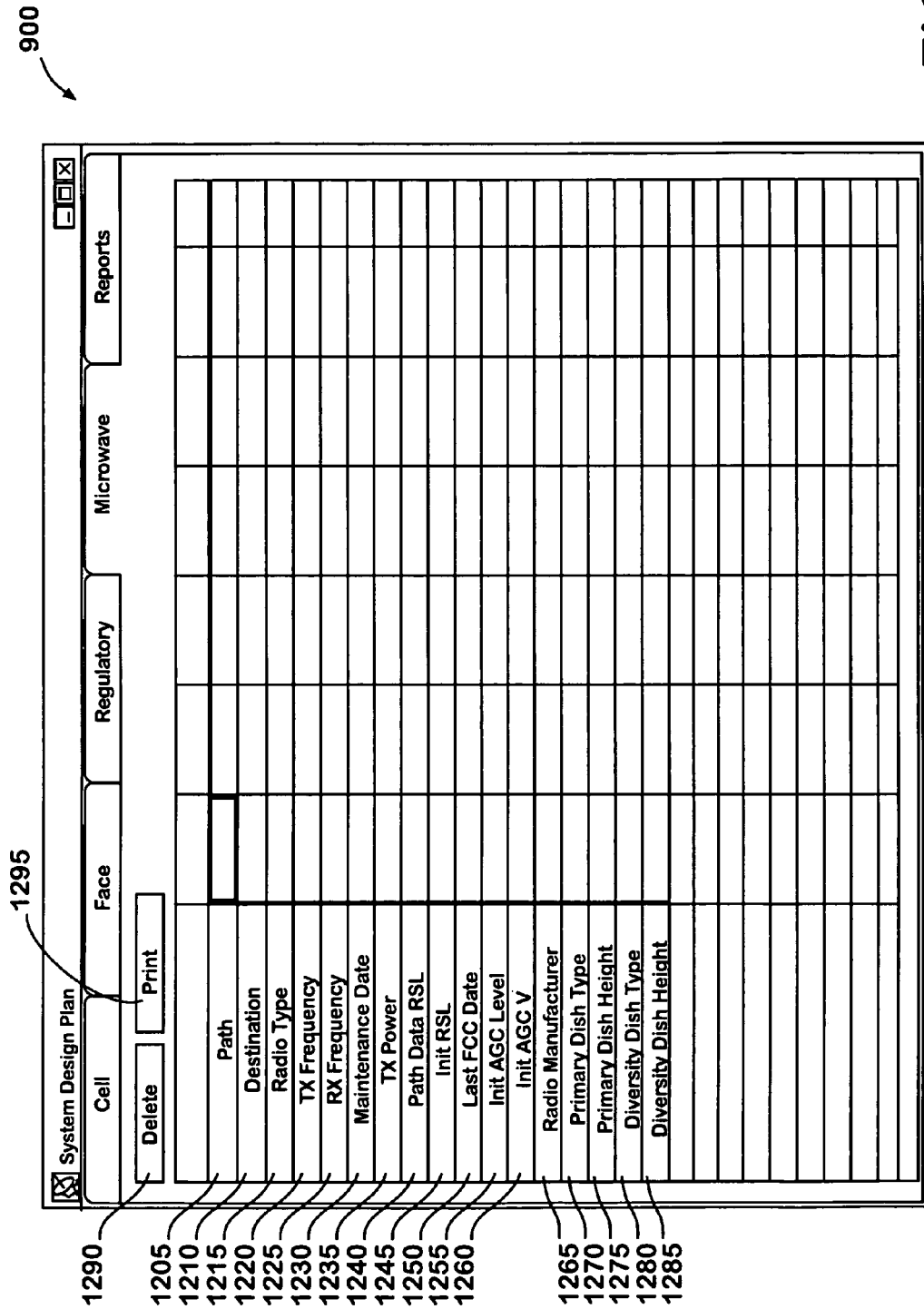
FIG. 9 is an illustration of a system design plan main menu in accordance with an embodiment of the present invention with a microwave tab selected.

Referring now to FIG. 6, the SDP main menu 900 comprises a plurality of tabs 905 that provide access to different information about cellular telecommunications network sites within the selected region field. For example, as illustrated in FIG. 6, the tabs 905 include a cell tab, a face tab, a regulatory tab, a microwave tab and a reports tab. Each of these tabs, when selected, causes different information regarding a cellular telephone network to be displayed to the user. For example, as illustrated in FIG. 9, when the cell tab is selected, location information and other information regarding a particular cellular site is presented to the user.

Referring to FIG. 6, when the cell tab is selected, the system design plan software application may display information such as a site name 907, a site number 909, an address 911 of the cell site, a city 913, state 915 and zip code 917 of the cell site, the county 919 of the cell site, the structure 921 of the cell site (such as the type of tower), the equipment 923 deployed at the cell site, the building type 925 of the cell site, the location 927 of the cell site, the electronic control processor (ECP) 929 of the cell site, and the digital cellular switch (DCS) 931 of the cell site. A photograph 933 of the cell site may also be displayed.

In addition, when the cell tab is selected, the system design plan software application may also cause a new button 935, a commit button 937, a rollback button 939, a work order button 941, and an exit button 943 to be displayed. The new button, when selected, allows for a new revision of an existing cell site. The commit button, when selected, saves any revisions. The rollback button, when selected, cancels any changes The work order button, when selected, transfers the user to a work order application for issuing a work order. The exit button 943, when selected, exits the system design plan software application 20 and returns the display to the distributed information system main menu 800 (FIG. 5).

When the cell tab is selected the system design plan software application may also display a current revision number 945, a revision date 947 and a revised by name 949 to identify the revision number, date and who revised the information displayed in the cell tab. Revision notes may also be displayed in field 951 so that the last person who revised the cell information may add their revision notes describing what was revised.

Referring now to FIG. 7, when the face tab is selected, the system design plan software application may display information regarding the cell face of a particular cell site such as engineering related information. A face name 1015 is displayed for each cell face. Under each cell face column, the following information is displayed: an azimuth 1017, number 1019 of receiver antennas, receiver line type 1021, receiver manufacturer name 1023, receiver model number 1025, receiver horizontal beam width 1027, receiver vertical beam width 1029, receiver electrical down tilt 1031, receiver mechanical down tilt 1033, receiver antenna gain 1035, receiver line loss 1037, number 1039 of transmitter antennas, transmitter antenna tip above ground level (AGL) 1041, receiver antenna C/L AGL 1043, transmitter line type 1045, transmitter manufacturer information 1047, transmitter model information 1049, transmitter horizontal beam width 1051, transmitter vertical beam width 1053, transmitter electrical down tilt 1055, transmitter mechanical down tilt 1057, transmitter antenna gain 1059, transmitter line loss 1061, ERP with dBm 1063, and other information. A delete button 1005 and a print button 1010 may also be displayed to the user.

Referring now to FIG. 8, when the regulatory tab is selected, particular regulatory information regarding a cell site may be displayed such as information used for FAA/FCC filings. In one embodiment of the invention, the regulatory information includes a survey date 1105, a deploy date 1110, the latitude of the cell site 1115, the longitude of the cell site 1120, FAA ground AMSL 1125, FAA structure height 1130, FAA total AMSL 1135, FAA study 1140, FCC ground AMSL 1145, FCC structure height AGL 1150, FCC total height AGL 1155, FCC registration number 1160, ASAC study 1165, EA file number 1170, 489 file number 1175, airport direction 1180, and airport distance 1185.

When the regulatory tab is selected, a number of checkboxes 1190 for different safety features of the cell site may be checked if the safety feature is present. For example, the safety features may comprise whether the cell site is within an AM protected area, whether the cell site includes a high intensity strobe or a medium intensity strobe, whether the cell site includes red beacons, whether the cell site includes orange/white paint, whether the cell site has a dual lighting system, etc.

Referring now to FIG. 9, when the microwave tab is selected information regarding the microwave of the cellular site is displayed. In one embodiment of the invention, the information may include a path 1205, a destination 1210, a radio type 1215, a transmitter frequency 1220, a receiver frequency 1225, a maintenance date 1230, a transmitter power 1235, past data RSL 1240, initialization RSL 1245, last FCC date 1250, initialization AGC level 1255, initialization AGC V 1260, radio manufacturer 1265, primary dish type 1270, primary dish height 1275, diversity dish type 1280, and diversity dish height 1285.

A delete button 1290 and a print button 1295 are also displayed.

Figure 10:
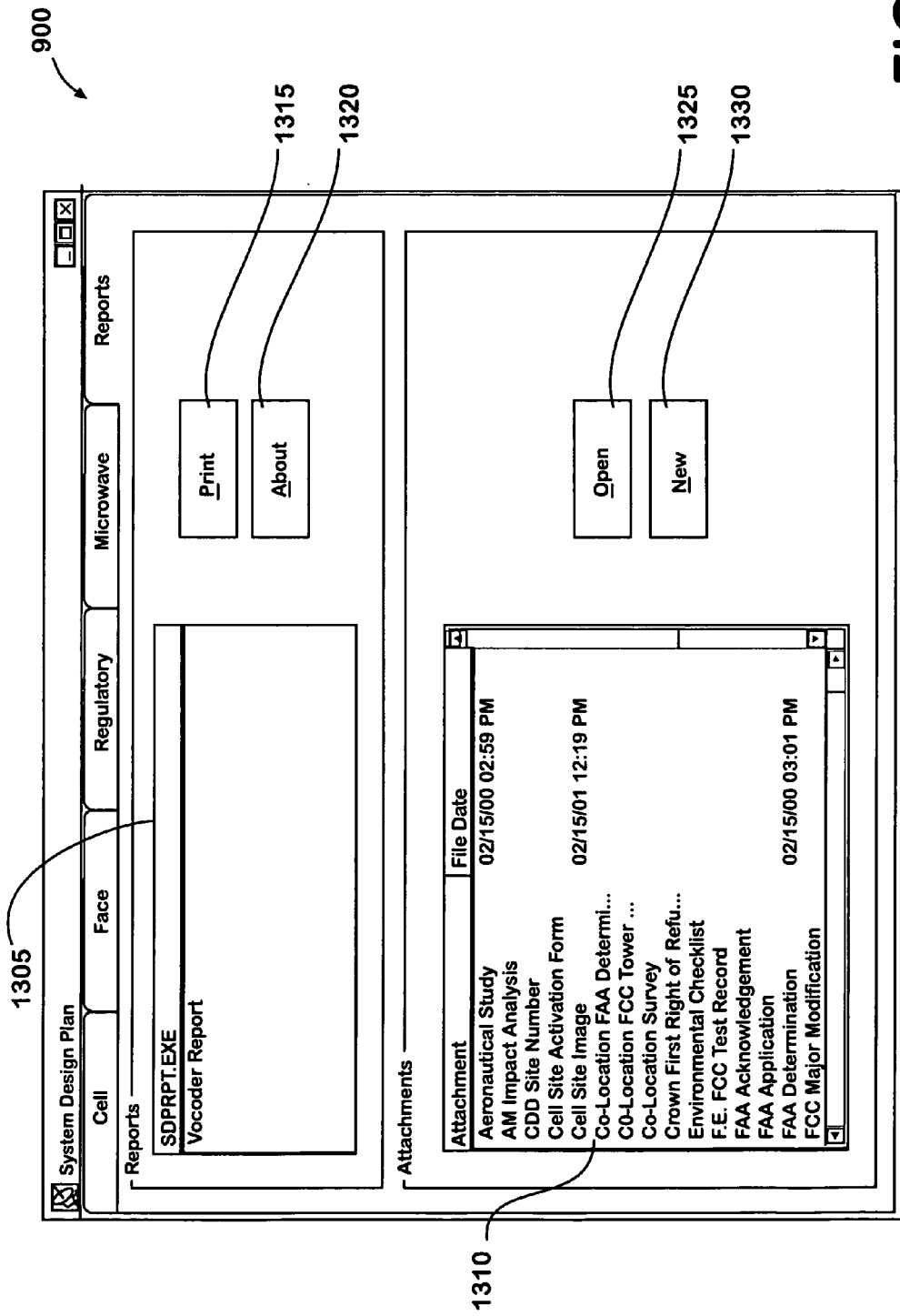
FIG. 10 is an illustration of a system design plan main menu in accordance with an embodiment of the present invention with a reports tab selected.

Referring now to FIG. 10, when the reports tab is selected a list 1305 of reports for the cellular site is displayed to the user. The display also includes a list 1310 of any attachments for the cellular site. The user will also be presented with a number of buttons such as a print button 1315, an about button 1320, an open button 1325 and a new button 1330.

Figure 11:
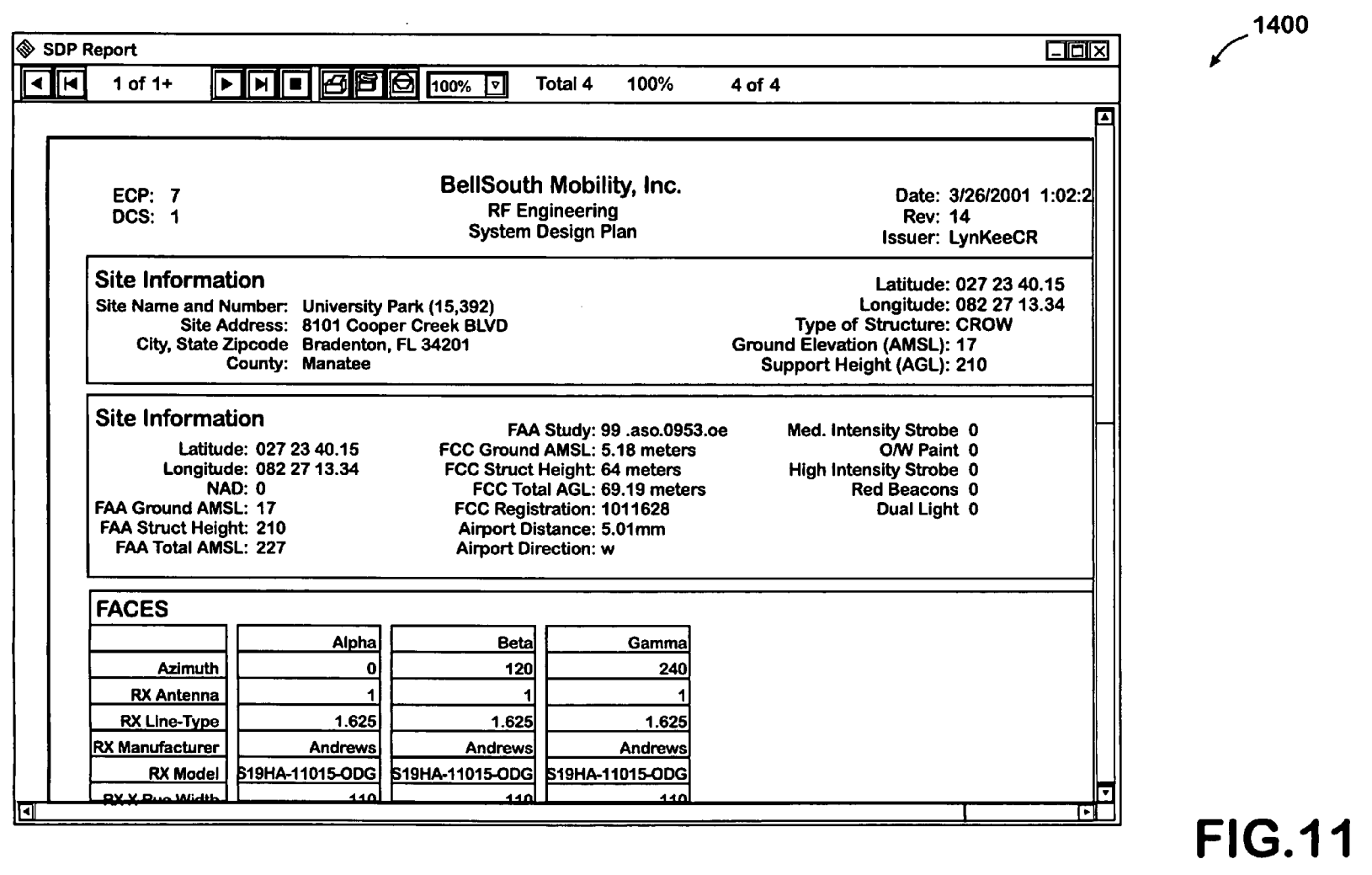

Referring now to FIG. 11, when a user selects to open a report or an attachment as described in reference to FIG. 13, the user will be presented with a display screen 1400 displaying the report to the user.

Although the present invention has been described above as implemented in a preferred embodiment, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for maintaining cellular telecommunications site data, comprising:
   providing a user interface accepting an identifier of a cellular telecommunications site;
   in real-time, determining current cellular telecommunications site data corresponding to the cellular telecommunications site identified by the identifier from a common database; and
   providing the current cellular telecommunications site data to an output device such that the data may be simultaneously viewed, wherein the data comprises cellular site identification information, site specific equipment identification information, revision information, and information for entering a work order.

2. The method of claim 1 wherein providing a user interface comprises providing a user interface to one or more users.

3. The method of claim 2, wherein the one or more users have access to changes made to the cellular telecommunications site data by at least one other user.

4. The method of claim 1, wherein the user interface comprises a plurality of tabs, each of which corresponds to a category of data about cellular telecommunications network sites within the selected region field.

5. The method of claim 4, wherein the plurality of tabs comprises at least a tab category corresponding to cellular site identification and location information, a tab category corresponding to cell face engineering information, a tab category corresponding to regulatory information, and a tab category corresponding to microwave information.

6. An apparatus for maintaining cellular telecommunications site data, comprising:
 a computer for use in maintaining the cellular telecommunications site data, the computer having one or more processors that execute one or more sets of instructions, a memory device for storing the one or more sets of instructions to be executed and a storage device coupled to the one or more processors, wherein the instructions in the memory device in the computer cause the one or more processors to:
 provide a user interface;
 accept an identifier of a cellular telecommunications site;
 in real-time, determine current cellular telecommunications site data corresponding to the cellular telecommunications site identified by the identifier from a common database; and
 provide the current cellular telecommunications site data to an output device such that the data may be simultaneously viewed, wherein the data comprises cellular site identification information, site specific equipment identification information, and revision information.

7. The apparatus of claim 6 wherein the output device is selected from the group of a monitor, a printer, a facsimile and a plotter.

8. The apparatus of claim 6 wherein one or more users have access to changes made to the cellular telecommunications site data that were made by at least one other user.

9. The apparatus of claim 6, wherein the user interface comprises a plurality of tabs, each of which corresponds to a category of data about cellular telecommunications network sites within the selected region field.

10. The apparatus of claim 9, wherein the plurality of tabs comprises at least a tab category corresponding to cellular site identification and location information and a tab category corresponding to cell face engineering information.

11. A computer-readable medium having a set of computer-readable instructions stored thereon, wherein the computer-readable instructions are operative to perform the following actions when executed by a computer:
 provide a user interface accepting an identifier of a cellular telecommunications site;
 in real-time, determine current cellular telecommunications site data corresponding to the cellular telecommunications site identified by the identifier from a common database; and
 provide the current cellular telecommunications site data to an output device such that the data may be simultaneously viewed, wherein the data comprises cellular site identification information, revision information, and information for entering a work order.

12. The computer-readable medium of claim 11, wherein the user interface comprises a plurality of tabs, each of which corresponds to a category of data about cellular telecommunications network sites within the selected region field.

13. The computer-readable medium of claim 12, wherein the plurality of tabs comprises at least a tab category corresponding to cellular site identification and location information, a tab category corresponding to cell face engineering information, and a tab category corresponding to report generation for a telecommunication network site.

14. The computer readable medium of claim 11, wherein the computer-readable instructions are operative to provide the user interface to one or more users.

15. The computer readable medium of claim 14, wherein one or more users have access to changes made to the cellular telecommunications data that were made by at least one other user.

16. A computer-implemented user interface for providing real-time cellular telecommunications site data to a user, the user interface comprising:
 a plurality of tabs that provide access to different aspects of the cellular telecommunications network site data within a selected region field, wherein the plurality of tabs comprise a cell tab; and
 when the cell tab is selected, cellular telecommunications site data is displayed to the user, wherein the data comprises cellular site identification information, site specific equipment identification information, revision information, and information for entering a work order.

17. The user interface of claim 16, wherein each of the plurality of tabs corresponds to a category of data about cellular telecommunications network sites within the selected region.

18. The user interface medium of claim 17, wherein the plurality of tabs comprises at least a tab category corresponding to cell face engineering information, a tab category corresponding to regulatory information, and a tab category corresponding to microwave information.

19. The user interface of claim 16, wherein the user interface is provided to one or more users.

20. The user interface of claim 19, wherein one or more users have access to changes made to the cellular telecommunications site data that were made by at least one other user.

* * * * *